US009562554B2

(12) United States Patent
Vidal et al.

(10) Patent No.: US 9,562,554 B2
(45) Date of Patent: Feb. 7, 2017

(54) RETAINER ASSEMBLY

(71) Applicants: David J. Vidal, Beamsville (CA); John Wilusz, Hamilton (CA); Brad S. Axelson, Lake Orion, MI (US)

(72) Inventors: David J. Vidal, Beamsville (CA); John Wilusz, Hamilton (CA); Brad S. Axelson, Lake Orion, MI (US)

(73) Assignee: A. RAYMOND ET CIE, Grenoble (FR)

( * ) Notice: Subject to any disclaimer, the term of this patent is extended or adjusted under 35 U.S.C. 154(b) by 167 days.

(21) Appl. No.: 14/598,972

(22) Filed: Jan. 16, 2015

(65) Prior Publication Data
US 2016/0208839 A1 Jul. 21, 2016

(51) Int. Cl.
| | |
|---|---|
| F16B 37/02 | (2006.01) |
| F16B 13/08 | (2006.01) |
| F16B 5/02 | (2006.01) |
| F16B 37/04 | (2006.01) |
| F16B 5/06 | (2006.01) |
| F16B 19/10 | (2006.01) |
| F16B 21/08 | (2006.01) |

(52) U.S. Cl.
CPC ............ *F16B 13/08* (2013.01); *F16B 5/0258* (2013.01); *F16B 37/02* (2013.01); *F16B 37/043* (2013.01); *F16B 5/0642* (2013.01); *F16B 19/1081* (2013.01); *F16B 21/086* (2013.01)

(58) Field of Classification Search
CPC ........ F16B 13/08; F16B 5/0258; F16B 13/122
USPC .... 411/60.2, 74, 112, 125, 173–175; 24/295
See application file for complete search history.

(56) References Cited

U.S. PATENT DOCUMENTS

| | | | | |
|---|---|---|---|---|
| 3,486,158 A | * | 12/1969 | Soltysik | F16B 5/0233 411/44 |
| 4,312,614 A | | 1/1982 | Palmer et al. | |
| 4,925,351 A | * | 5/1990 | Fisher | F16B 37/043 411/182 |
| 5,011,356 A | | 4/1991 | Fernandez | |

(Continued)

FOREIGN PATENT DOCUMENTS

| | | |
|---|---|---|
| EP | 0588467 | 3/1994 |
| WO | 2012125360 | 9/2012 |

OTHER PUBLICATIONS

International Search Report and Written Opinion dated May 19, 2016 from corresponding International Patent Application No. PCT/US2016/012764.

*Primary Examiner* — Gary Estremsky
(74) *Attorney, Agent, or Firm* — Dickinson Wright PLLC

(57) ABSTRACT

A retainer assembly for retaining a panel to a component. The retainer assembly includes a base defining a bore for receiving a screw. A pair of front and back support members each have a first section connected to the base, and a second section that overlies the bore for flexing outwardly in response to being engaged by the screw. A front and back primary retention member each extend outwardly from the front and back support members for holding the retainer assembly relative to the panel. A pair of front and back secondary retention members each extend outwardly from the first section of the front and back support members. The front and back secondary retention members terminate closer to the base than the front and back primary retention members to establish an interference fit between the retainer assembly and the panel prior to the screw being driven through the retainer assembly.

20 Claims, 5 Drawing Sheets

(56) References Cited

U.S. PATENT DOCUMENTS

| | | | |
|---|---|---|---|
| 5,249,900 A | 10/1993 | Mitts | |
| 5,873,690 A | 2/1999 | Danby et al. | |
| 5,919,019 A * | 7/1999 | Fischer | F16B 37/043 411/112 |
| 6,279,207 B1 | 8/2001 | Vassiliou | |
| 6,353,981 B1 | 3/2002 | Smith | |
| 6,629,809 B2 | 10/2003 | Vassiliou | |
| 6,908,274 B1 | 6/2005 | Vassiliou | |
| 6,928,705 B2 | 8/2005 | Osterland et al. | |
| 6,971,830 B2 | 12/2005 | Hulin et al. | |
| 7,086,125 B2 * | 8/2006 | Slobodecki | B60R 13/0206 24/293 |
| 7,287,945 B2 | 10/2007 | Lubera et al. | |
| 7,322,784 B2 | 1/2008 | Castro et al. | |
| 7,419,206 B2 | 9/2008 | Slobodecki et al. | |
| 7,496,993 B2 | 3/2009 | Kosidlo et al. | |
| 7,568,870 B2 * | 8/2009 | Paquet | F16B 37/043 411/125 |
| 7,572,089 B2 * | 8/2009 | Lowry | F16B 37/02 411/182 |
| 7,725,991 B2 | 6/2010 | Lubera et al. | |
| 8,162,579 B2 | 4/2012 | Rueckel | |
| 8,348,569 B2 | 1/2013 | Tournier | |
| 8,790,056 B2 | 7/2014 | Fuentes Domingo et al. | |
| 2006/0168773 A1 * | 8/2006 | Smith | F16B 5/0657 24/295 |
| 2008/0086850 A1 * | 4/2008 | Smith | B60R 13/0206 24/289 |
| 2010/0107372 A1 | 5/2010 | Reznar | |
| 2011/0097137 A1 | 4/2011 | Spitz | |

* cited by examiner

RETAINER ASSEMBLY

BACKGROUND OF THE INVENTION

1. Field of the Invention

A retainer assembly for retaining a panel to a component.

2. Discussion

Retainer assemblies, i.e. expansion nuts, are used in various industries, including the automotive industry, to retain panels to other components. For example, a retainer assembly may be used to retain a door trim panel to a supporting metal sheet of the door.

An example of such a retainer assembly is presented in FIG. 1. In use, such a retainer assembly is received by a slot defined by a panel. The retainer assembly includes a base that defines a bore for receiving a screw. A pair of front support members and a pair of back support members extend from the base. The front and back support members each have a first section that is connected to the base and a second section that extends from the first section and at least partially overlies the bore. Because the front and back support members overly the bore, they flex outwardly against the panel in response to being engaged by the screw, thereby retaining the retainer assembly to the panel.

A front primary retention member extends outwardly from the front support member and a back primary retention member extends outwardly from the back support member. The front and back primary retention members limit movement of the retainer assembly relative to the panel after the retainer assembly has been inserted into the slot, but prior to the screw being extended through the bore.

A known issue with such retainer assemblies is that despite the presence of the front back primary retention members, the retainer assembly is susceptible to movement, i.e., slop, relative to the panel after insertion of the retainer assembly in the slot but prior to insertion of the screw. This is particularly problematic when the retainer assembly is used to secure relatively thin panels, and when the retainer assembly is subjected to external forces like vibrations or the pressing of objects against the retainer assembly. Accordingly, the need exists for an improved retainer assembly that can accommodate panels of various thicknesses and can withstand the application of external forces.

SUMMARY OF THE INVENTION

The invention provides for a retainer assembly for being secured to a panel, with the retainer assembly received by a slot defined by the panel. The retainer assembly includes a base defining a bore for receiving a screw. The retainer assembly also includes at least one front support member and at least one back support member that each have a first section that is connected to the base, and a second section that extends from the first section and at least partially overlies the bore. At least a portion of each of the front and back support members is resiliently flexible for flexing the front and back support members outwardly against the panel in response to being engaged by the screw to secure the retainer assembly to the panel.

A front primary retention member extends outwardly from the front support member, and a back primary retention member extending outwardly from the back support member. The front and back primary retention members limit movement of the retainer assembly relative to the panel prior to the screw being extended through the bore.

At least one front secondary retention member extends outwardly from the first section of the front support member, and at least one back secondary retention member extends outwardly from the first section of the back support member. The front and back secondary retention members terminate closer to the base than the front and back primary retention members, establishing an interference fit between the retainer assembly and the panel for preventing slop between the retaining assembly and the panel prior to the screw being extended through the bore.

The invention in its broadest aspect therefore can accommodate panels of various thicknesses and can withstand external forces being applied against the retainer assembly due to the interference fit between the retainer assembly and the panel provided by the front and back secondary retention members.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 8:
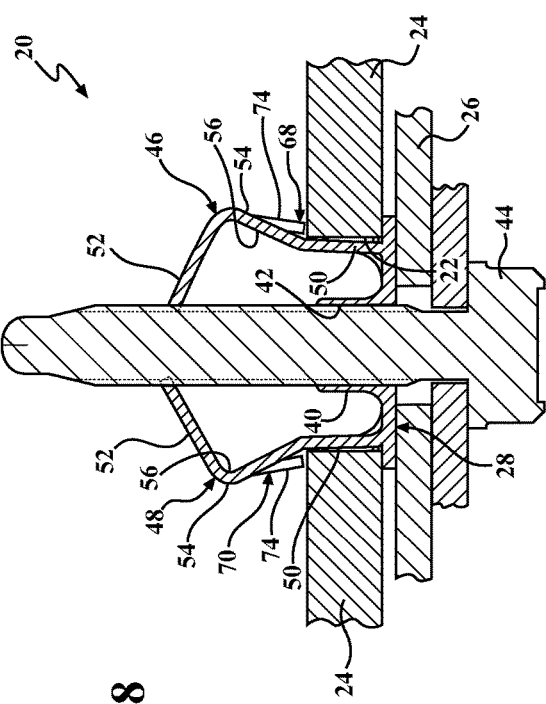
FIG. 8 is a side cross-sectional view of the preferred embodiment of the subject retainer assembly inserted in a slot of a panel after a screw has been driven through the retainer assembly.

Referring to the Figures, wherein like numerals indicate corresponding parts throughout the several views, a retainer assembly 20 is generally shown for being inserted into and secured to a slot 22 defined by a panel 24 for retaining the panel 24 to a component 26. The retainer assembly 20 generally includes a base 28 having a bore 42, a plurality of front and back support members 46, 48 that extend from the base 28, front and back primary retention member 68, 70 that extend outwardly from the front and back support members 46, 48, and a plurality of front and back secondary retention members 82, 84 that each extend from one of the front and back support members 46, 48. FIGS. 2-6 show all of the foregoing portions of the retainer assembly 20. It should be appreciated that the retainer assembly shown 20 shown in FIGS. 2-6 show the retainer assembly 20 in a formed position without the use of a screw (not shown) and without use in connection with a panel and component (as shown in FIG. 8).

Figure 9:
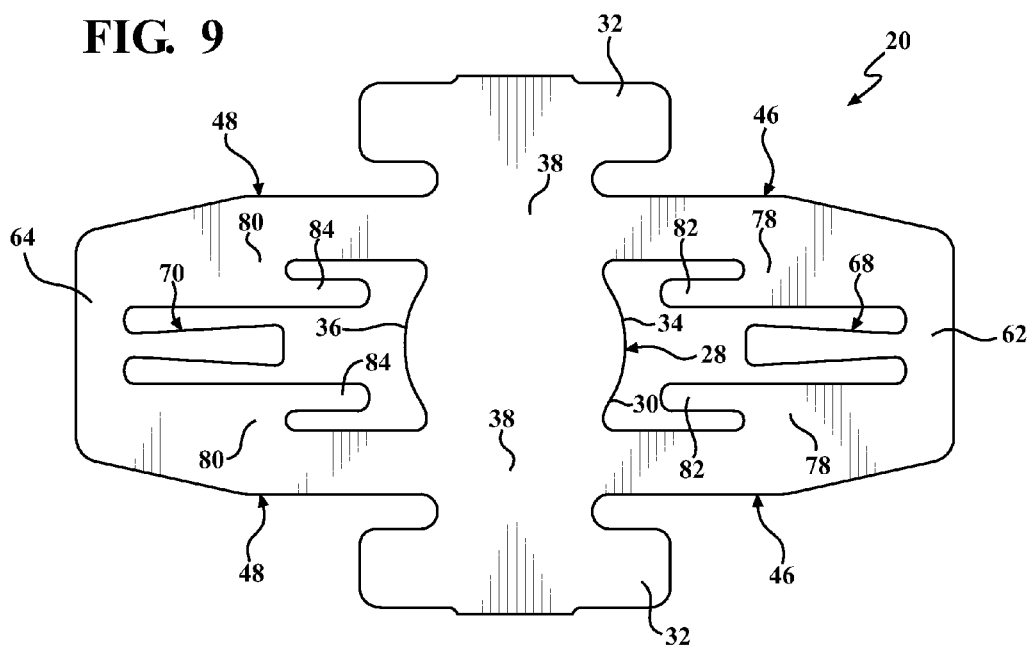
FIG. 9 is a flat blank view of the preferred embodiment of the subject retainer assembly.

FIG. 9 shows the retainer assembly 20 in the pre-formed state, as shown in the industry as the flat blank form—that form resulting from stamping the shape of the retainer assembly 20 from the relevant material, in this case steel. It should be appreciated that the retainer assembly 20 could be made of other materials, e.g., aluminum or organic polymer materials.

As best presented in FIGS. 2-6, the retainer assembly 20 includes the base 28 that extends in a plane P. It should be appreciated that the base 28 does not have to be planar, i.e., it could have an irregular surface. The base 28 has a hub 30 and a pair of flanges 32. The hub 30 has a front edge 34, a back edge 36 and a pair of side portions 38 that extend between the front and back edges 34, 36. Each of the flanges 32 have a generally rectangular shape and are connected to the side portions 38 of the hub 30 with the flanges 32 extending in spaced and parallel relationship with one another in the plane P. As best shown in FIG. 8, the flanges 32 engage the panel 24 when the retainer assembly 20 is inserted in the slot 22 to limit the distance in which the retainer assembly 20 may be inserted.

A cylinder 40 extends from the hub 30 along an axis A that is in perpendicular relationship with the plane P. The cylinder 40 and the base 28 define the bore 42. The bore 42 includes threads that extend therethrough for threadedly receiving a screw 44. It should be appreciated that the bore 42 could receive fastening devices other than a screw 44, e.g., a bolt.

The pair of front support members 46 extend from the front edge 34 in spaced relationship with one another, and the pair of back support members 48 extend from the back edge 36 in spaced relationship with one another. The front and back support members 46, 48 each have a generally L-shaped cross-section—each include a first section 50 that is connected to the base 28 and extends generally parallel to the axis A, and a second section 52 that extends from the first section 50 in generally parallel relationship with the plane P.

The front and back support members 46, 48 each further have a rearward face 54, a forward face 56, an outward edge 58 and an inward edge 60. The inward edges 60 of the front support members 46 face one another and the inward edges 60 of the back support members 48 face one another.

The second sections 52 of the front support members 46 further include a front connection 62 that extends in generally parallel relationship with the plane P between the pair of front support members 46. Likewise, the second sections 52 of the back support members 48 include a back connection 64 that extends in generally parallel relationship with the plane P between the pair of back support members 48. It should be appreciated that the front and back connections 62, 64 don't need to extend parallel to the plane P—they could extend at other angles.

The back connection 64 overlies the front connection 62 in alignment with the bore 42. Because of the alignment of at least a portion of the front and back support members 46, 48 over the bore 42, the front and back support members 46, 48 flex away from one another and into the panel 24 in response to the screw 44 being threadedly driven through the bore 42 against the front connection 62, causing retention of the retainer assembly 20 to the panels 24 (as best shown in FIG. 8). It should be appreciated that only a portion of the front and back support members 46, 48 must overly the bore 42 to cause the outward flexing of the front and back support members 46, 48. Further, as shown in FIG. 8, the screw 44 is extended through the component 26 (presented as panel 26) before extending through the retainer assembly 20 to secure the component 26 to the panel 24.

In the preferred embodiment, the entirety of the retainer assembly 20 is made of a resiliently flexible steel material, thereby allowing, the front and back support members 46, 48 to flex away from one another at the interface between the base 28 and the first section 50 of the front and back support members 46, 48. It should be appreciated, however, that only a portion of the front and back support members 46, 48 need be made of a resiliently flexible material, e.g., only at the interface between the base 28 and the first segment 66.

Figure 1:
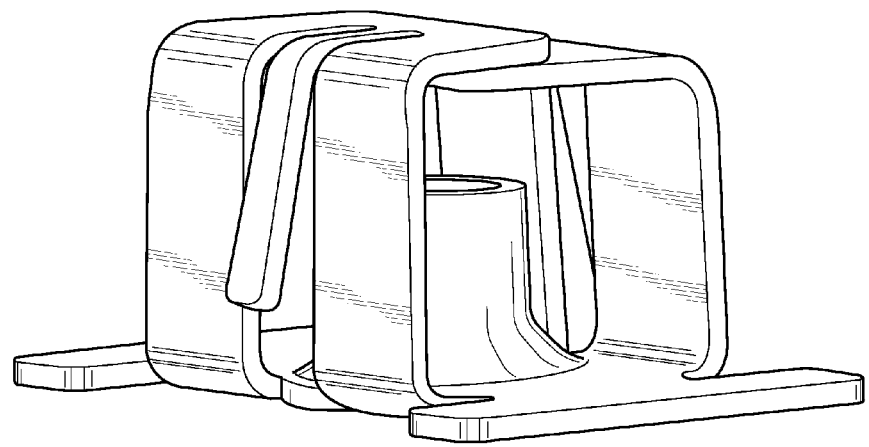
FIG. 1 is a perspective view of a prior art retainer assembly.
Figure 2:
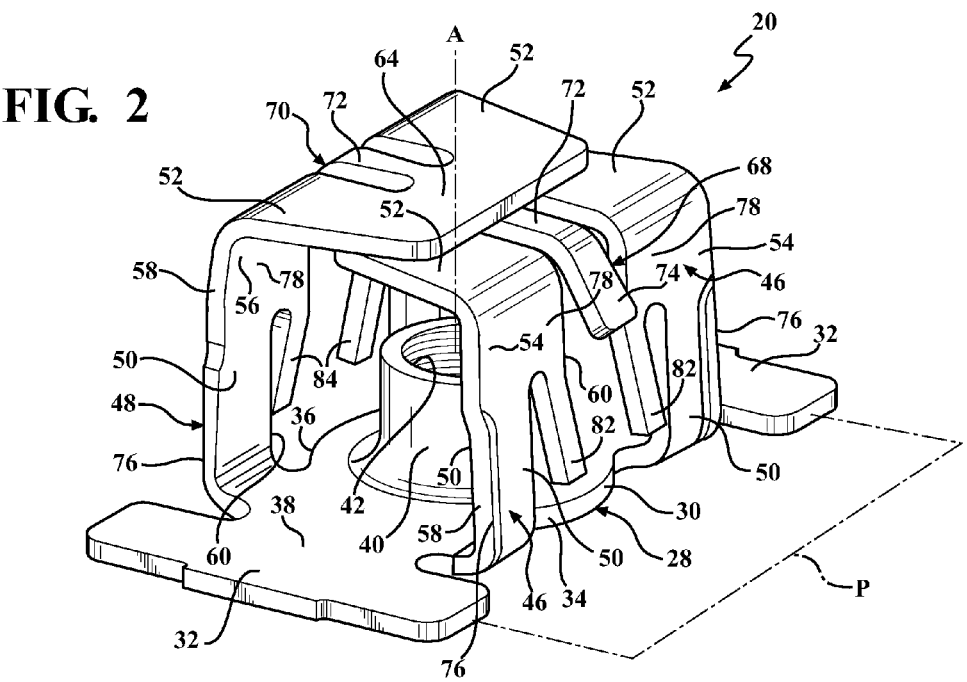
FIG. 2 is a perspective view of a preferred embodiment of the subject retainer assembly.
Figure 3:
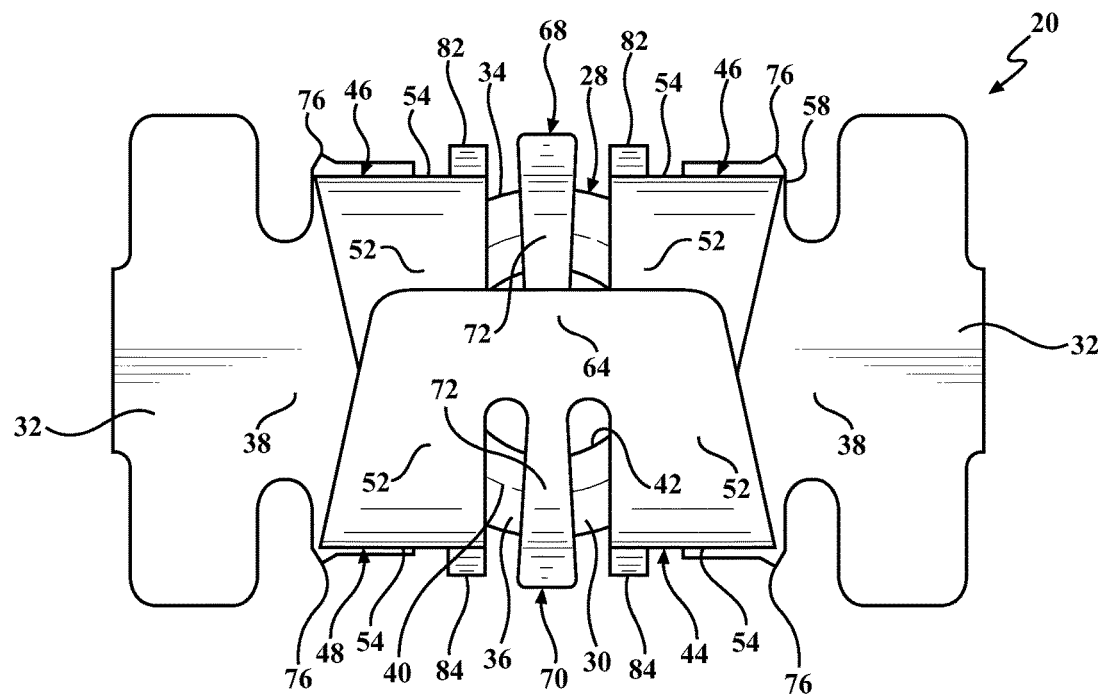
FIG. 3 is a top view of the preferred embodiment of the subject retainer assembly.
Figure 4:
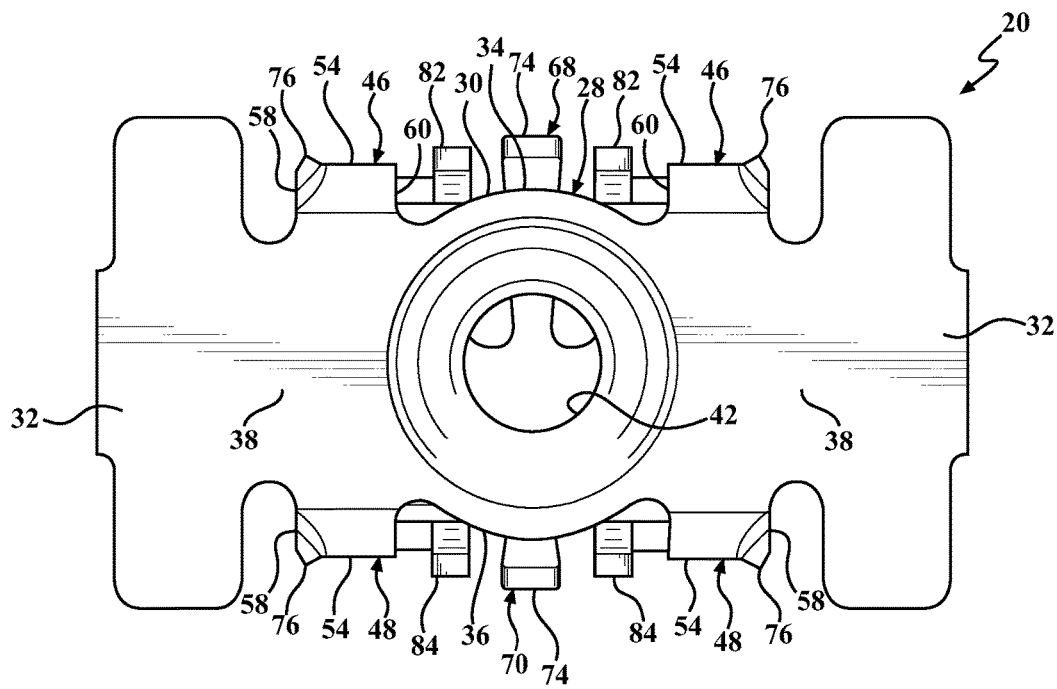
FIG. 4 is a bottom view of the preferred embodiment of the subject retainer assembly.
Figure 5:
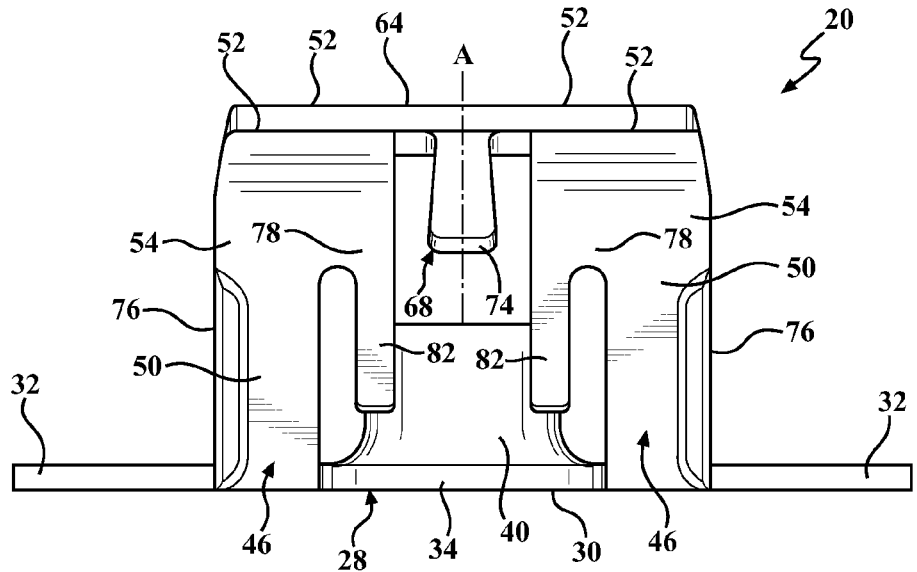
FIG. 5 is a side view of the preferred embodiment of the subject retainer assembly.
Figure 6:
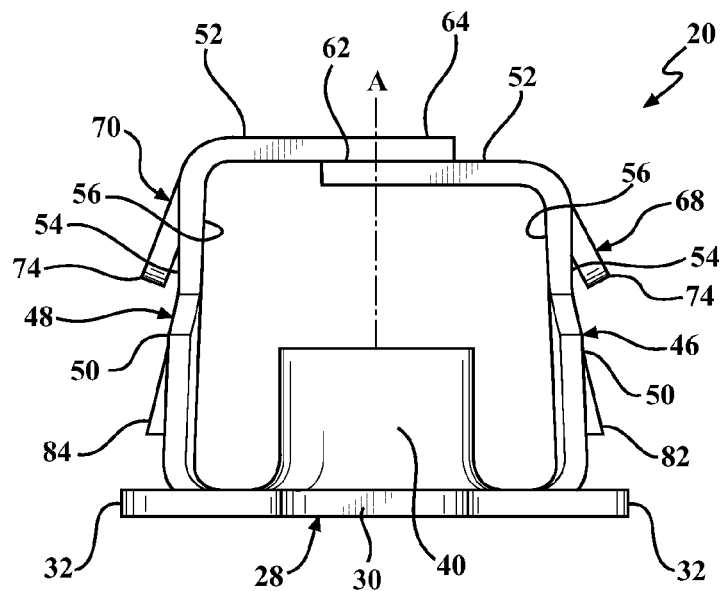
FIG. 6 is a front view of the preferred embodiment of the subject retainer assembly.
Figure 7:
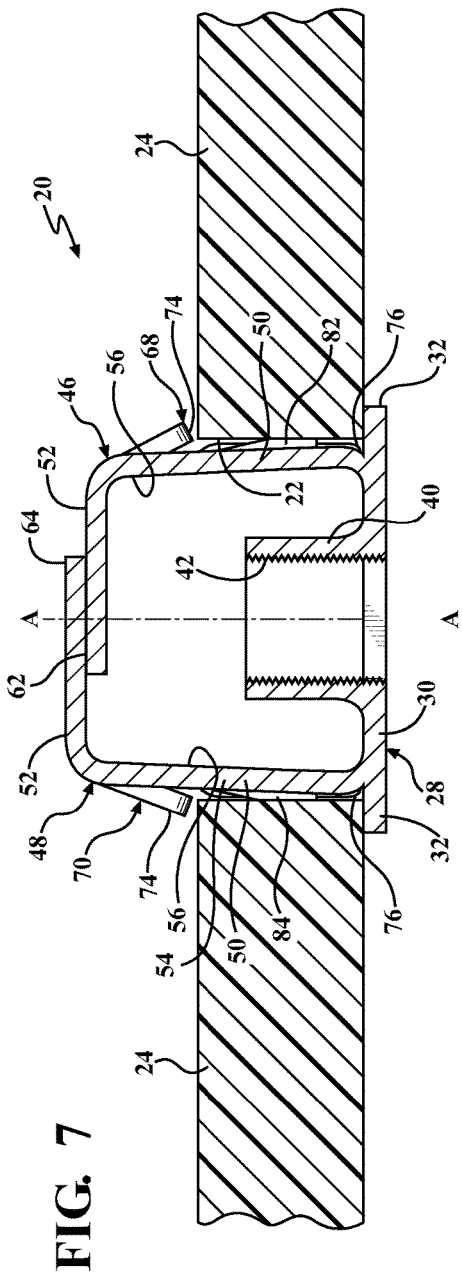
FIG. 7 is a side cross-sectional view of the preferred embodiment of the subject retainer assembly inserted in a slot of a panel prior to a screw being driven through the retainer assembly.

The front primary retention member 68 extends outwardly from the front connection 62 between the front support members 46, and back primary retention member 70 extends outwardly from the back connection 64 between the back support members 48. The front and back primary retention members 68, 70 each have a proximal segment 72 and a distal segment 74. The proximal segment 72 extends generally parallel to the plane P, and the distal segment 74 extends toward the plane P at a first angle $\alpha_1$ relative to the plane P (shown in FIG. 10). During insertion of the retainer assembly 20 into the slot 22, upon application of a relatively small insertion force, the front and back primary retention members 68, 70 flex inwardly, and flex back outwardly to their original position once the retaining assembly 20 has been inserted into the slot 22 by a predetermined distance. As shown in FIG. 7, once the retainer assembly 20 has been inserted by the predetermined distance, the front and back primary retention member 68, 70 at least partially limit movement of the retainer assembly 20 relative to the panel 24. It should be appreciated that the length of the front and back primary retention members 68, 70 may vary based on the thickness of the panel 24 with which they are used.

A pair of front shoulders 78 each extend from the inward edge 60 of one of the first sections 50 of the front support members 46. Likewise, a pair of back shoulders 80 each extend from the inward edge 60 of one of the first sections 50 of the back support members 48. The front shoulders 78 extend toward one another and the back shoulders 80 extend toward one another.

A pair of front secondary retention members 82 each extend outwardly from one of the front shoulders 78. Correspondingly, a pair of back secondary retention members 84 each extend outwardly from one of the back shoulders 80. The front and back secondary retention members 82, 84 terminate closer to the base 28 than the front and back primary retention members 68, 70, and therefore maintain contact with the panel 24 after the retainer assembly 20 has been inserted into the slot 22 by the predetermined distance. The front secondary retention members 82 extend on opposing sides of the front primary retention member 68, and the back secondary retention members 84 extend on opposing sides of the back primary retention member 70.

Figure 10:
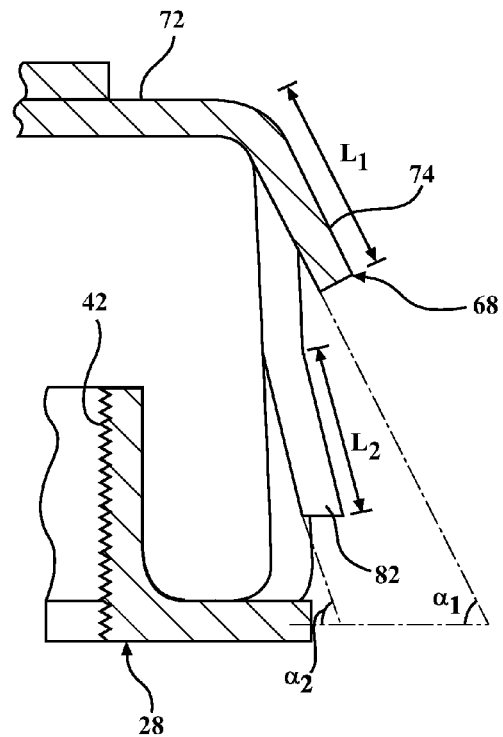
FIG. 10 is a partial side cross-sectional view of the lengths of and angles at which the primary and secondary retention members of the preferred embodiment of the subject retainer assembly extend.

As best presented in FIG. 10, the front and back secondary retention members 82, 84 each extend at a second angle $\alpha_2$ relative to the plane P, with the second angle $\alpha_2$ being larger than the first angle $\alpha_1$. Further, the distal segment 74 of the front and back primary retention members 68, 70 is longer than the front and back secondary retention members 82, 84 ($L_1$ is greater than $L_2$). Combined, these aspects cause the insertion force necessary to flex the front and back secondary retention members 82, 84 to be greater than the insertion force required to flex the front and back primary retention members 68, 70.

In use, the front and back secondary retention members 82, 84 flex inwardly upon application of an insertion force that is larger than that required to flex the front and back primary retention members 68, 70. Upon application of this insertion force, the base 28 of the retainer assembly 20 aligns generally flush with the panel 24. Because the front and back secondary retention members 82, 84 terminate closer to the base 28 than the front and back primary retention members 68, 70 and because they require a relatively large force to flex inwardly, they maintain contact with the panel 24 in an interference fit prior to the screw 44 being extended through the bore 42, thereby substantially preventing slop between the retaining assembly and the panel 24 even when the retainer assembly 20 is used with panels of various thicknesses and when the retainer assembly 20 is subjected to external forces.

A barb 76 is positioned between the rearward face 54 and the outward edge 58 of the first section 50 of each of the front and back support members 46, 48. Each of the barbs 76 extend from the base 28 and up approximately half of the length of the first section 50. The barbs 76 penetrate at least a portion of the panel 24 as the front and back support members 46, 48 flex outwardly as the screw 44 is driven into bore 42, therefore aiding in holding the retainer assembly 20 to the panel 24 during the application of lateral forces against the retainer assembly 20.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A retainer assembly for being secured to a panel with said retainer assembly received by a slot defined by the panel, said retainer assembly including;
    a base defining a bore for receiving a screw,
    at least one front support member and at least one back support member each having a first section connected to said base and a second section extending from said first section and at least partially overlying said bore wherein at least a portion of each of said front and back support members is resiliently flexible for flexing said front and back support members outwardly against the panel in response to being engaged by the screw to secure said retainer assembly to the panel,
    a front primary retention member extending outwardly from said front support member and a back primary retention member extending outwardly from said back support member each for limiting movement of said retainer assembly relative to the panel prior to the screw being extended through said bore,
    at least one front secondary retention member extending outwardly from said first section of said front support member and at least one back secondary retention member extending outwardly from said first section of said back support member with said front and back secondary retention members terminating closer to said base than said front and back primary retention members to establish an interference fit between said retainer assembly and said panel for preventing slop between said retaining assembly and the panel prior to the screw being extended through said bore,
    said at least one front support member including a pair of front support members in spaced relationship with one another and connected to one another at a front connection and said at least one back support member including a pair of back support members in spaced relationship with one another and connected one another at a back connection,
    said at least one front secondary retention member including a pair of front secondary retention members each extending from said first segment of one of said front support members and said at least one back secondary retention member including a pair of back secondary retention members each extending from said first segment of one of said back support members, and
    wherein said front primary retention member extends from said front connection and said back primary retention member extends from said back connection.

2. The retainer assembly as set forth in claim 1 wherein said front and back primary retention members each have a distal segment extending at a first angle relative said base,
    said distal segments of each of said front and back primary retention members are longer than each of said front and back secondary retention members.

3. The retainer assembly as set forth in claim 2 wherein said front and back secondary retention members each extend at a second angle relative to said base with said second angle being larger than said first angle.

4. The retainer assembly as set forth in claim 1 wherein said front primary retention members extends from said second section of said front support member and said back primary retention member extends from said second section of said back support member.

5. A retainer assembly as set forth in claim 1 and further including a cylinder extending from said hub along an axis in perpendicular relationship with said plane,
    said cylinder and said base defining said bore extending therethrough,
    said bore including threads for threadedly receiving the screw.

6. The retainer assembly as set forth in claim 1 wherein said pair of front secondary retention members are disposed on opposing sides of said front primary retention member and said pair of back secondary retention members are disposed on opposing sides of said back primary retention member.

7. The retainer assembly as set forth in claim 1 wherein said front connection and said back connection each extend parallel to said base and said back connection overlies said front connection in alignment with said bore.

8. A retainer assembly for being secured to a panel with said retainer assembly received by a slot defined by the panel, said retainer assembly including;
    a base defining a bore for receiving a screw,
    at least one front support member and at least one back support member each having a first section connected to said base and a second section extending from said first section and at least partially overlying said bore wherein at least a portion of each of said front and back support members is resiliently flexible for flexing said front and back support members outwardly against the panel in response to being engaged by the screw to secure said retainer assembly to the panel,
    a front primary retention member extending outwardly from said front support member and a back primary retention member extending outwardly from said back support member each for limiting movement of said retainer assembly relative to the panel prior to the screw being extended through said bore, at least one front secondary retention member extending outwardly from said first section of said front support member and at least one back secondary retention member extending outwardly from said first section of said back support member with said front and back secondary retention members terminating closer to said base than said front and back primary retention members to establish an interference fit between said retainer assembly and said panel for preventing slop between said retaining assembly and the panel prior to the screw being extended through said bore, said at least one front support member including a pair of front support members in spaced relationship with one another and connected to one another at a front connection and said at least one back support member including a pair of back support members in spaced relationship with one another and connected one another at a back connection, said at least one front secondary retention member including a pair of front secondary retention members each extending from said first segment of one of said front support members and said at least one back secondary retention member including a pair of back secondary retention members each extending from said first segment of one of said back support members, and wherein said front and back support members each have an inward edge with said inward edges of said front support members facing one another and said inward edges of said back support members facing one another, and a pair of front shoulders each extending from one of said inward edges of one of said front support members and a pair of rear shoulders each extending from one of said inward edges of one of said rear support members.

9. The retainer assembly as set forth in claim 8 wherein said front secondary retention members each extend from one of said front shoulders and said back secondary retention members each extend from one of said back shoulders.

10. The retainer assembly as set forth in claim 8 wherein said front and back primary retention members each have a distal segment extending at a first angle relative said base, said distal segments of each of said front and back primary retention members are longer than each of said front and back secondary retention members.

11. The retainer assembly as set forth in claim 10 wherein said front and back secondary retention members each extend at a second angle relative to said base with said second angle being larger than said first angle.

12. The retainer assembly as set forth in claim 8 wherein said front primary retention members extends from said second section of said front support member and said back primary retention member extends from said second section of said back support member.

13. A retainer assembly for being secured to a panel with said retainer assembly received by a slot defined by the panel, said retainer assembly including:

a base defining a bore for receiving a screw, at least one front support member and at least one back support member each having a first section connected to said base and a second section extending from said first section and at least partially overlying said bore wherein at least a portion of each of said front and back support members is resiliently flexible for flexing said front and back support members outwardly against the panel in response to being engaged by the screw to secure said retainer assembly to the panel, a front primary retention member extending outwardly from said front support member and a back primary retention member extending outwardly from said back support member each for limiting movement of said retainer assembly relative to the panel prior to the screw being extended through said bore, at least one front secondary retention member extending outwardly from said first section of said front support member and at least one back secondary retention member extending outwardly from said first section of said back support member with said front and back secondary retention members terminating closer to said base than said front and back primary retention members to establish an interference fit between said retainer assembly and said panel for preventing slop between said retaining assembly and the panel prior to the screw being extended through said bore, said at least one front support member including a pair of front support members in spaced relationship with one another and connected to one another at a front connection and said at least one back support member including a pair of back support members in spaced relationship with one another and connected one another at a back connection, said at least one front secondary retention member including a pair of front secondary retention members each extending from said first segment of one of said front support members and said at least one back secondary retention member including a pair of back secondary retention members each extending from said first segment of one of said back support members, wherein said base extends along a plane, and said front and back support members each have a generally L-shaped cross-section and include a first section extending in a direction perpendicular to said plane and a second section extending generally parallel to said plane.

14. The retainer assembly as set forth in claim 13 wherein said front and back primary retention members each have a distal segment extending at a first angle relative said base, said distal segments of each of said front and back primary retention members are longer than each of said front and back secondary retention members.

15. The retainer assembly as set forth in claim 14 wherein said front and back secondary retention members each extend at a second angle relative to said base with said second angle being larger than said first angle.

16. The retainer assembly as set forth in claim 13 wherein said front primary retention members extends from said second section of said front support member and said back primary retention member extends from said second section of said back support member.

17. A retainer assembly for being secured to a panel with said retainer assembly received by a slot defined by the panel, said retainer assembly including:

a base defining a bore for receiving a screw, at least one front support member and at least one back support member each having a first section connected to said base and a second section extending from said first section and at least partially overlying said bore wherein at least a portion of each of said front and back support members is resiliently flexible for flexing said front and back support members outwardly against the panel in response to being engaged by the screw to secure said retainer assembly to the panel, a front primary retention member extending outwardly from said front support member and a back primary retention member extending outwardly from said back support member each for limiting movement of said retainer assembly relative to the panel prior to the screw being extended through said bore, at least one front secondary retention member extending outwardly from said first section of said front support member and at least one back secondary retention member extending outwardly from said first section of said back support member with said front and back secondary retention members terminating closer to said base than said front and back primary retention members to establish an interference fit between said retainer assembly and said panel for preventing slop between said retaining assembly and the panel prior to the screw being extended through said bore, said at least one front support member including a pair of front support members in spaced relationship with one another and connected to one another at a front connection and said at least one back support member including a pair of back support members in spaced relationship with one another and connected one another at a back connection, said at least one front secondary retention member including a pair of front secondary retention members each extending from said first segment of one of said front support members and said at least one back secondary retention member including a pair of back secondary retention members each extending from said first segment of one of said back support members, wherein said front and back support members each further have a rearward face and a forward face and an outward edge and an inward edge with said inward edges of said front support members facing one another and said inward edges of said back support members facing one another, and a barb is defined by said first section of each of said front and back support members between said rearward face and said outward edge and adjacent to said base for penetrating at least a portion of the panel as said front and back support members flex outwardly as the screw is driven into said bore to aid in holding said retainer assembly to the panel during the application of lateral forces against said retainer assembly.

18. The retainer assembly as set forth in claim 17 wherein said front and back primary retention members each have a distal segment extending at a first angle relative said base, said distal segments of each of said front and back primary retention members are longer than each of said front and back secondary retention members.

19. The retainer assembly as set forth in claim 18 wherein said front and back secondary retention members each extend at a second angle relative to said base with said second angle being larger than said first angle.

20. The retainer assembly as set forth in claim 17 wherein said front primary retention members extends from said second section of said front support member and said back primary retention member extends from said second section of said back support member.

* * * * *